T866010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 23

795,353

CHEMICAL SENSITIZATION OF UNSENSITIZED PHOTOGRAPHIC SILVER HALIDE

Judith A. Schwan, Kodak Park Division, Rochester, N.Y. 14650

Filed Jan. 30, 1969. Published Sept. 2, 1969
Int. Cl. G03c *1/08, 1/74, 1/34*
U.S. Cl. 96—108
No Drawing. 18 Pages Specification

An unsensitized photographic silver halide emulsion layer is chemically sensitized at a desired time prior to exposure by subjecting the emulsion layer to elevated temperatures in the presence of a chemical sensitizer. A sulfur and gold-sensitized emulsion layer is provided by contacting the layer with a gold sensitizer subsequent to sulfur sensitization.